(12) United States Patent
Nice et al.

(10) Patent No.: US 6,468,107 B1
(45) Date of Patent: Oct. 22, 2002

(54) RECTANGULAR SHIM FOR ELECTRICAL RECEPTACLE OR SWITCH

(76) Inventors: Susan Mabie Nice, 128 E. Eighth St., Mishawaka, IN (US) 46544; Frank J. Posluszny, III, 128 E. Eighth St., Mishawaka, IN (US) 46544

(*) Notice: Subject to any disclaimer, the term of this patent is extended or adjusted under 35 U.S.C. 154(b) by 0 days.

(21) Appl. No.: 09/645,234

(22) Filed: Aug. 24, 2000

(51) Int. Cl.[7] .............................................. H01R 13/66
(52) U.S. Cl. ........................... 439/536; 174/53; 174/66
(58) Field of Search ................................ 439/536, 539, 439/568, 894; 174/67, 53; D13/66

(56) References Cited

U.S. PATENT DOCUMENTS

| | | | | |
|---|---|---|---|---|
| 4,025,144 A | * | 5/1977 | Thibeault | 439/536 |
| 4,203,638 A | * | 5/1980 | Tansi | 439/97 |
| 4,459,736 A | * | 7/1984 | Judkins | 439/569 |

* cited by examiner

*Primary Examiner*—Renee Luebke
*Assistant Examiner*—Briggitte R. Hammond

(57) ABSTRACT

A shim for adjusting the fit of an electrical receptacle, switch, or the like with the exposed surface of the surrounding wall is disclosed. The shim (10) most preferably comprises a generally rectangular-shaped piece of rigid material having a large shimming and connecting surface defined by a central notched cutout opening (24) and mounting screw slot (22). Most preferably, the shim (10) is characterized by one large shimming surface (20) having a notched cutout (24) to fit a receptacle (50), switch or similar electrical fixture and mounting and adjusting slot in the connecting surface. This configuration provides a shimming surface (20) having increased shimming area, while providing a shim (10), which is easily installed. The mounting prong bevel (28) helps to lock in the mounting prong (52) keeping the shim (10) firmly in place.

1 Claim, 3 Drawing Sheets

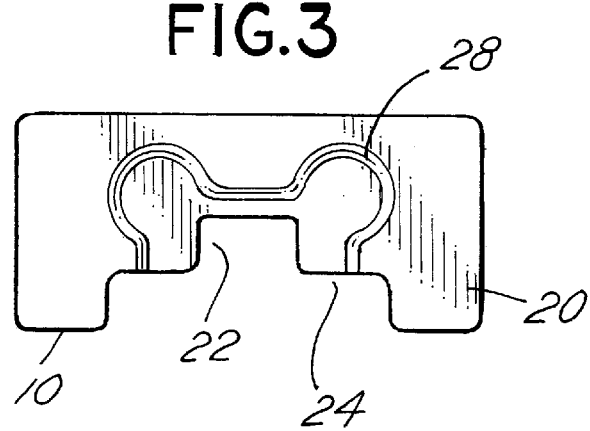
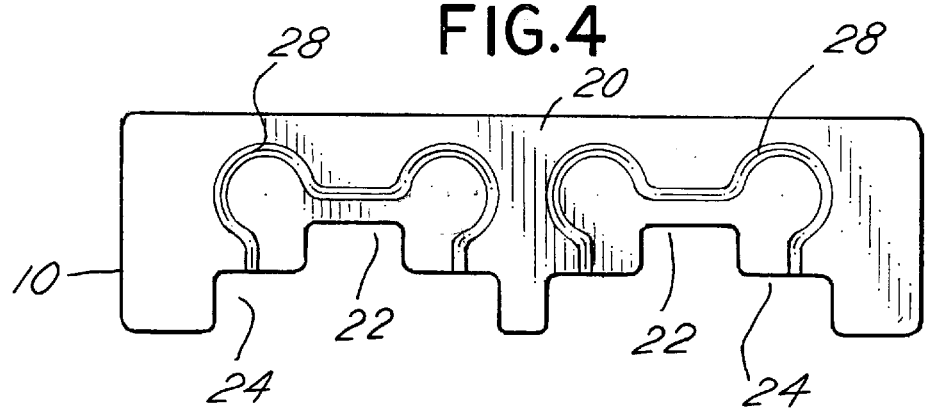
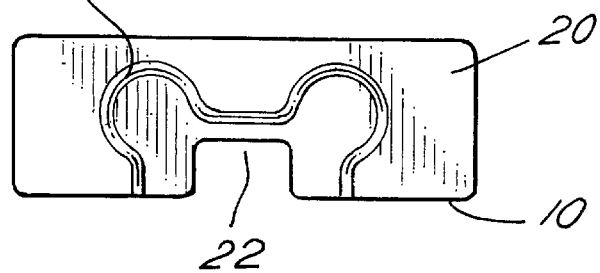

RECTANGULAR SHIM FOR ELECTRICAL RECEPTACLE OR SWITCH

CROSS-REFERENCE TO RELATED APPLICATIONS

Not applicable.

BACKGROUND-FIELD OF INVENTION

This invention relates generally to a device for use in shimming an electrical receptacle, switch, or similar fixture, especially such a fixture previously installed in an outlet box behind a wall surface. More particularly, a shim, both simple to manufacture and easy to use, most preferably constructed of a simple piece of rigid, generally rectangular shaped material for shimming previously installed electrical fixtures is disclosed.

This invention also relates to a shim to be used to install a receptacle, switch, or similar electrical fixture where the opening is too large for the mounting arm or arms.

BACKGROUND-DESCRIPTION OF PRIOR ART

The basic configuration of electrical receptacle, switched, or similar fixtures has remained unchanged for over half a century. During that time, the method of installation of these fixtures have also remained virtually unchanged.

In general, the outlet boxes and required wiring are installed on studs after framing, but before installation of the walls. Gypsum board, paneling, or the like, is then installed with a hole approximately the required size for the electrical fixture being cut therein. The fixture is then installed in the outlet box and secured against the exposed wall surface prior to final attachment of the receptacle cover, switch plate, or the like.

Particularly in large scale commercial installations, it has been found that it is commercially advantageous to depart from the above installation procedure by having the electrician install the electrical fixture in the outlet box at the time the initial wiring is performed. Accordingly, the electrical fixtures are installed prior to the installation of the gypsum board, paneling, or other material. Using this construction technique, the pre-installed electrical is withdrawn from the outlet box through the appropriate hole in the affixed wall material and then secured in place.

Using either method, but with greater frequency when the electrical fixture is pre-installed, the hole in the wall surface may be too large or inexactly placed to provide a surface to which the fixture may be securely engaged. With standard electrical fixtures, the wall surface surrounding the hole may provide little or no support for one or both of the mounting prongs. Accordingly, the fixture could not be securely mounted against the wall surface. Numerous makeshift shimming means are used to solve this problem. These means include the use of washers placed around the mounting screws and behind the mounting prongs to provide the additional required shimming to permit the fixture to be securely affixed. Other means of shimming these fixtures include a wrapping of wire around the mounting screws and behind the mounting prongs to produce the desired shimming with the outlet box. These crude solutions are time consuming to fashion and install and provide only marginally satisfactory results.

Therefore the C-shaped shim was invented to solve the installation problems. U.S. Pat. No. 4,459,736 to Judkins (1984) discloses a C-shaped shim which installs on top of the wall yet behind the mounting prong and cover plate.

(a) The C-shaped shim calls for a partial or complete removal of the receptacle, switch, or similar electrical fixture. This is time consuming and if energized, it can be dangerous.
(b) The supporting part of the C-shaped shim passes the energized part of the receptacle, switch, or similar electrical fixture.
(c) The mounting prongs of the receptacle, switch, or similar fixture catch only a small part of the shim arms.
(d) Though the shimming surface is long, it is not wide enough to be of substantial support.

SUMMARY

In accordance with the present invention a shim that fits between the mounting prongs and the wall surface to support a receptacle, switch, or similar electrical fixture that is flat and made of rigid material in a rectangular shape vertically aligned.

OBJECTS AND ADVANTAGES

Accordingly, besides the objects and advantages of the C-shaped shim in the above patent, several objects and advantages of the present invention are:

(a) To provide a simple shim which in a preferred embodiment is easily and conveniently manufactured from a single piece of rigid material, such as 16–20 gauge sheet metal or rigid plastic.
(b) To provide in its simplest embodiment, a shim of such size, shape, and thickness as to fit behind and be concealed by a receptacle cover or switch plate.
(c) To provide a rigid shimming surface fir use with standard electrical receptacles, switches, or similar fixtures, suitable for contacting all of the mounting prong.
(d) To provide at least one connecting surface, preferably only one connecting surface to connect the shimming surface to the wall surface.
(e) To provide a notched cutout opening to fit one end of the receptacle, switch, or similar fixture bounded by the shimming and connecting surface. This notched cutout opening is of sufficient size and shape to receive therethrough the upper or lower (one end) body of the fixture when the shim and fixture are positioned in vertical alignment.
(f) To provide a shim of generally rectangular shape.
(g) To provide a single shimming device to be used to properly shim an electrical receptacle, switch, or similar fixture at one or both of its two mounting prongs.
(h) To provide a shim with a slot for the mounting screw to fit through and for adjustment of the electrical receptacle, switch, or similar fixture.
(i) To provide a shim with a bevel fitted to surround the upper part of the mounting prong.

DRAWING FIGURES

FIG. 3 is a perspective drawing of an alternative embodiment of the shim of the present invention, illustrating a shim enlarged for an enlarged wall opening to fit behind an enlarged cover plate for the receptacle mounting means.

Figure 1:
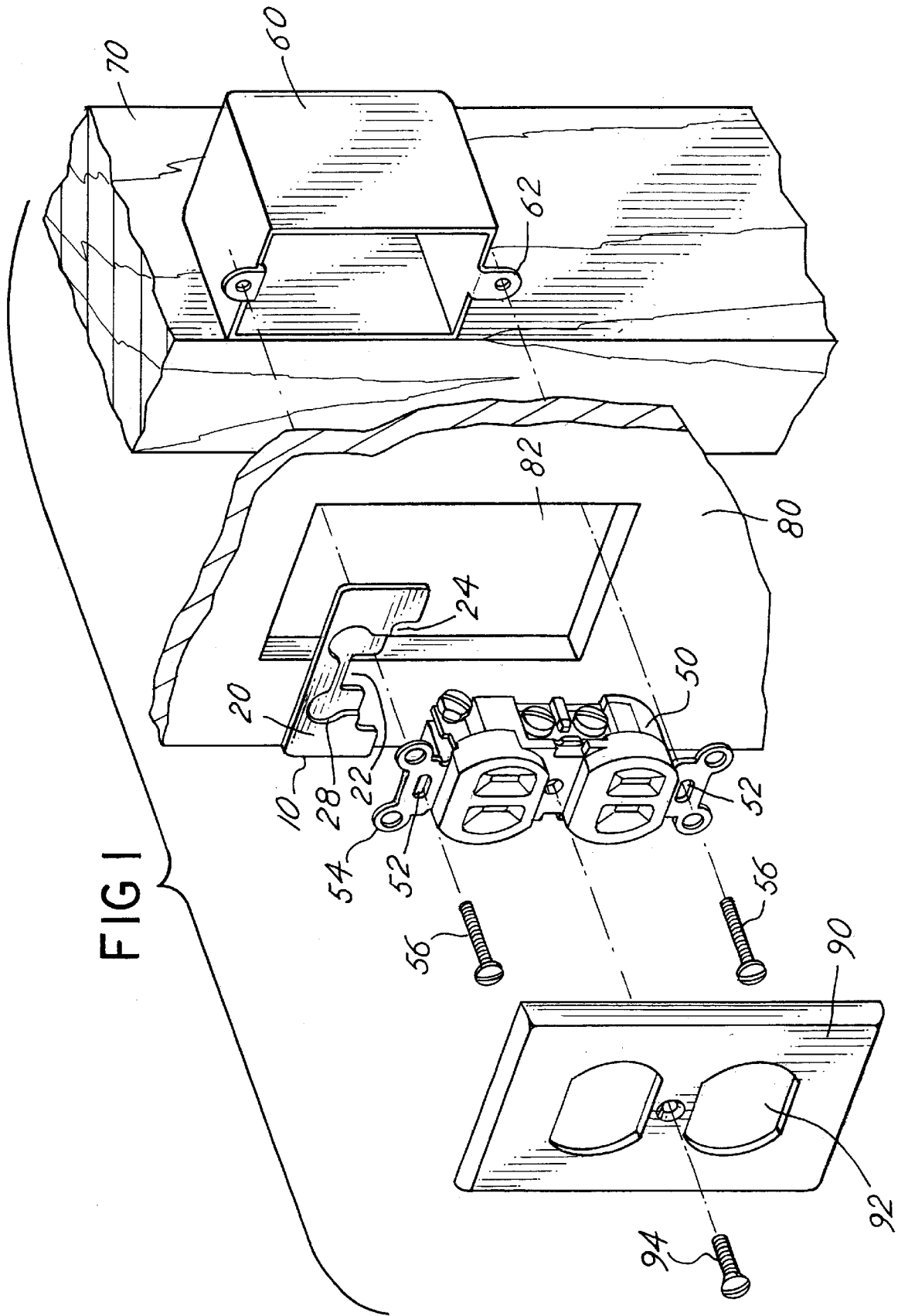
FIG. 1 is a perspective drawing of the preferred embodiment of the shim of the present invention in its intended environment of use. This figure illustrates the shim and its intended environment of use in an exploded view illustrating the installation layers and the electrical receptacle ghosted in its installed position.

FIG. 4 is a perspective drawing of an alternative embodiment of the shim of the present invention with two openings cut to fit two side-by-side receptacles and large enough to be behind both of the mounting prongs of one end of the receptacles. This embodiment may be increased to fit any number of electrical receptacles mounted side-by-side in an outlet box. The width of the shim of the present invention will increase with the number of receptacles to be installed side-by-side. With each one having a notched cutout and mounting and adjusting screw slots for each receptacle.

FIG. 5 is a perspective drawing of an alternative embodiment of the shim of the present invention having a mounting screw slot and without a notched cutout in its rectangular shape.

REFERENCE NUMERALS IN DRAWINGS

| | |
|---|---|
| 10 shim | 20 shim surface |
| 22 mounting screw slot | 24 notched cutout |
| 28 mounting prong bevel | 50 receptacle |
| 52 mounting prong | 54 breakaway tabs |
| 56 mounting screw | 60 outlet box |
| 62 attachment tabs | 70 stud |
| 80 wall surface | 82 fixture opening |
| 90 cover plate | 92 receptacle opening |
| 94 cover screw | |

DESCRIPTION

Figure 2:
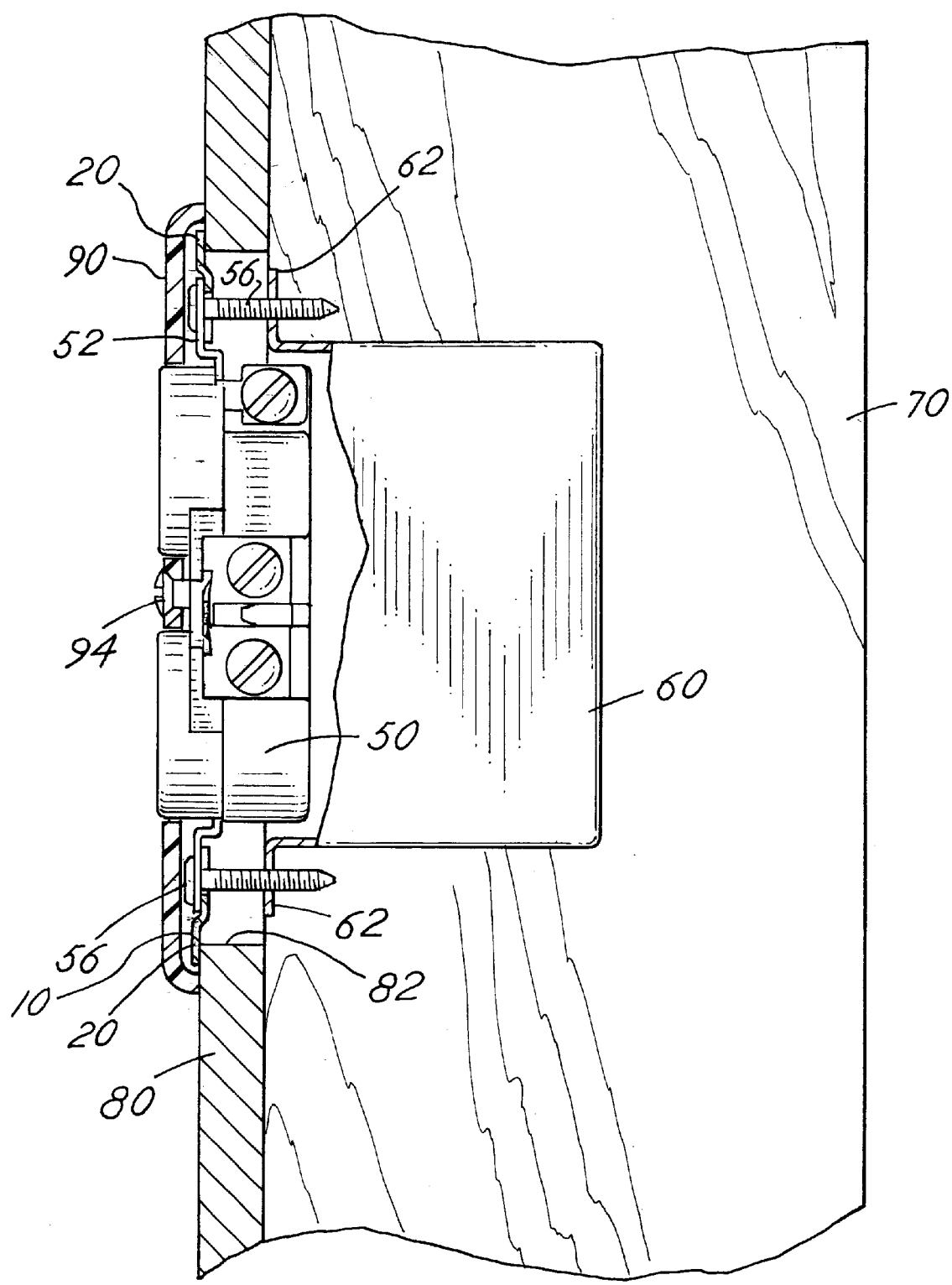
FIG. 2 is a cross-sectional side view illustrating the shim of the present invention in its intended environment of use.

FIGS. 1 and 2—Preferred Embodiment

The shim of the present invention is useful for adjusting the fit of an electrical receptacle 50, switch, switch or other similar fixture with the exposed surface of the surrounding wall 80. In the most preferred embodiment, illustrated in FIG. 1, shim 10 is formed from a single, thin piece of rigid sheet material, preferably galvanized steel. However, shim 10 may be manufactured from any suitable material providing sufficient rigid shimming surfaces, such as sheet metals, rigid plastics, or the like are used.

The shim of the present invention comprises a shim 10 of such size, shape, and thickness as to fit behind and be concealed by a receptacle cover 90, switch plate, or the like. Generally, the overall configuration of shim 10 will be that of a flat, rectangular shimming device to be concealed behind a standard receptacle cover 90 or switch plate, and fit snugly on one end of the receptacle 50, switch, or similar fixture.

Standard electrical fixtures such as receptacle 50 are installed to outlet box 60 at fixture attachment tabs 62 using mounting screws 56 through mounting prongs 52, including breakaway tabs 54. outlet box 60 is attached to stud 70, the floor, ceiling, or the like using screw, bolts, or other conventional means.

Receptacle 50 is secured against the exposed surface of a wall 80 such as gypsum board located between mounting prongs 52 and outlet box 60. receptacle 50 is positioned through a fixture opening 82 in wall 80. in an ideal installation, prongs 52 and breakaway tabs 54 are securely affixed against the exterior surface of wall 80 or the like when screws 56 are tightened. However, in many installations, fixture opening 82 is irregular, oversized, or improperly positioned. In such installations, one or both of the mounting prongs 52 and breakaway tabs 54 may not securely contact wall 80 or the like. In these installations, receptacle 50 cannot be securely installed at the exposed surface of the wall 80, but remains loose or affixed at a recessed location. Accordingly, a shimming device is required. The present invention provides a shim 10 which permits electrical receptacle 50 to be securely engaged in place without any chance of tilting and with greater surface contact.

Shim 10 is characterized by a large rigid shimming surface 20. shimming surface 20 is suitable for contacting all of the mounting prongs 52 of electrical receptacle 50, switch, or similar electrical fixture at one end. Two shims may not be needed to secure a receptacle 50, switch, or electrical fixture. Shimming surface 20 with mounting screw slot 24 are of sufficient size and shape to receive therethrough one end of the main body of receptacle 50 and mounting screw 56, but not of sufficient size and shape to receive therethrough the entirety of mounting prong 52 when shim 10 and receptacle 50 are positioned in proper alignment.

In the preferred embodiment, notched cutout 24 will be of such size and shape as to fit snugly on one end of a receptacle 50, switch, or similar electrical fixture. The notched cutout 24 is to be cut as to fit over the desired receptacle 50, switch, or similar electrical fixture.

FIG. 3—Additional Embodiment

In another embodiment, shim 10 's shimming surface 20 is enlarged to fit over an extra large opening and behind an oversized cover plate 90. This special shim is an enlargement of the preferred embodiment of the rectangular shim 10, having the same notched cutout 24, mounting screw slot 22, and mounting prong bevel or recess 28, with shimming surface 20 enlarged as in FIG. 3.

FIG. 4—Alternative Embodiment

Yet another embodiment of shim 10 comprises of two notched cutouts 24, each having a mounting screw slot 22 and a mounting prong bevel 28, in a side-by-side configuration in a double width shim 10. This is to fit over one end of each of side-by-side receptacles 50, in a double gang box as in FIG. 4.

FIG. 5—Additional Embodiment

Yet another embodiment of shim 10 comprises of the elimination of all notched cutouts 24 leaving the mounting screw slot 22 and the mounting prong bevel 28 on the shimming surface 20 of the rectangular shaped shim 1 as in FIG. 5.

Advantages

From the description above, a number of advantages of my vertically installed shim becomes evident:

(a) The shimming surface of the shim of the present invention is of a size large enough to engage the entirety of the mounting prong of the receptacle, switch, or similar electrical fixture.

(b) The larger shimming surface also allows for a greater contact with the wall surface.

(c) The notched cutout makes for a snug fit on the receptacle, switch, or similar fixture keeping the shim in place during installation.

(d) The screw adjustment slot allows the shim to be adjusted with the receptacle, switch, or similar fixture, to keep it in line when the box is installed in less than vertical alignment to the wall.

(e) The mounting screw slot allows for easy fitting of the shim onto the receptacle, switch, or similar fixture, between the mounting prong and the wall surface.

(f) The ease of installation allows for the slight loosening of the mounting screw to insert the shim into place.

(g) The design of the shim of the present invention eliminates the passing of the shim material near the energized part of the receptacle, switch, or similar fixture.

(h) The design of the shim of the present invention allows for the use of only one shim at one end when only one end is needing to be shimmed.

(i) With the shim of the present invention, having three potential barring surfaces, both sides and the top, there is a greater chance of contact with the wall surface giving greater stability.

(j) With the shim of the present invention, it is of use with multiple gang boxes when the receptacle, switch, or similar electrical fixtures are installed in side-by-side configurations.

(k) The shim of the present invention can be used on horizontally installed receptacles, switches, or similar fixtures, by installing them in horizontal alignment to the fixture.

(l) The shim of the present invention may be used with either a standard switch or receptacle.

(m) The shim of the present invention may be made to be used with other than standard electrical switches, receptacles, or similar fixtures.

Operation—FIGS. 1 and 2

The manner of using the vertically installed shim starts with the installation of the receptacle 50, switch, or similar electrical fixture. At that time it is clear rather a shim 10 in needed to install the receptacle 50 correctly. If a shim is needed, one or both of the mounting screws 56 are loosened and at that time the shim 10 is inserted between the mounting prongs 52 and the wall surface 80. The shim 10, should be slid over the end needing to be shimmed until it fits snugly onto the end of the receptacle 50 and until the mounting screw 56 is in the mounting screw slot 22. At this point, the mounting prong 52 is fitted against the mounting prong bevel 28. At this point, the mounting screw 56 can be tightened and the cover plate 90 with receptacle opening 92 is then installed with cover screw 94.

In use, a shim 10 constructed according to the present invention, having notched cutout 24 and being generally rectangular shaped, is easily employed with electrical receptacle 50 or the like which have been pre-installed and slightly loosened in outlet box 60. The method of using shims 10 comprises adjusting the mounting means, such as mounting screw 56 of receptacle 50 or the like so that shim 10 may be fitted between the mounting prong 52 of one end of receptacle 50 and the exposed surface of the wall 80. An appropriately shaped shim 10 having a notched cutout 24 is selected from the shims described above. Such a shim may be easily and conveniently inserted between the mounting prong 52 of one end of receptacle 50 and the exposed surface of wall 80, by sliding the shim 10 over one end of the receptacle 50 or the like, passing the mounting screw 56 through the mounting screw slot 22, the mounting prong bevel 28 is then behind the mounting prong 52. When so arranged; the entirety of the mounting prong 52 including breakaway tabs 54 completely contact the shimming surface 20.

Finally, the mounting means such as mounting screws 56, are adjusted to securely and firmly engage shim 10 between mounting prong 52 and the exposed surface of wall. For aesthetic purposes, cover plate 90 having receptacle opening 92 is installed with screw 94.

Conclusions, Ramifications, and Scope

Accordingly, the reader will see that the shim of this invention can be used to shim a receptacle, switch or similar fixture easily and conveniently with little effort and with complete safety. Furthermore, the rectangular shim has the additional advantages in that It provides a quick solution for installation of a receptacle, switch, or similar fixture when the mounting prongs do not touch the wall surface;

It provides a firm, neatly installed receptacle, switch, or electrical fixture;

It allows for the adjustment of the receptacle, switch, or similar fixture to fit vertically or horizontally in the wall opening;

It can be used on either or both ends of a receptacle, switch, or similar fixture;

It provides a large surface with possible contact with the wall surface on three sides; and It can be used on multiple side-by-side receptacles, switches, or similar fixture installations when an alternative embodiment is used of the use of overlapping singular shims in a side-by-side configuration.

The foregoing description of the present invention has been directed in primary part to a particular preferred embodiment in accordance with the requirements of the patent statues and for purpose of explanation and illustration. It will be apparent however, to those skilled in the art that many modifications and changes in this specific apparatus may be made without departing from the scope and spirit of the invention. For example, the exact configuration of the shim of the present invention may be altered to conform with any shape receptacle and mounting means and corresponding cover plate. Therefore, the invention is not restricted to the particular form of construction illustrated and described, but covers all modifications and variations which may fall within the scope of the following claims.

What is claimed is:

1. A shim for use in securing an electrical device to an outlet box within an opening in a wall, said device including a body and an extending mounting prong for interconnection to said outlet box, said shim being of a generally thin planar configuration and having a mounting prong bevel for accommodating, in recessed form, the device mounting prong when the shim is placed between and in contact with both the mounting prong and said wall at said wall opening, said shim having a notched cut out oppositely located from said mounting prong bevel for receiving a part of said device body adjacent said mounting prong.

* * * * *